Sept. 15, 1964 W. J. WHITE 3,148,751
MOUNTING MEANS FOR AN ELECTROMAGNETIC BRAKE ASSEMBLY
Filed Dec. 29, 1961
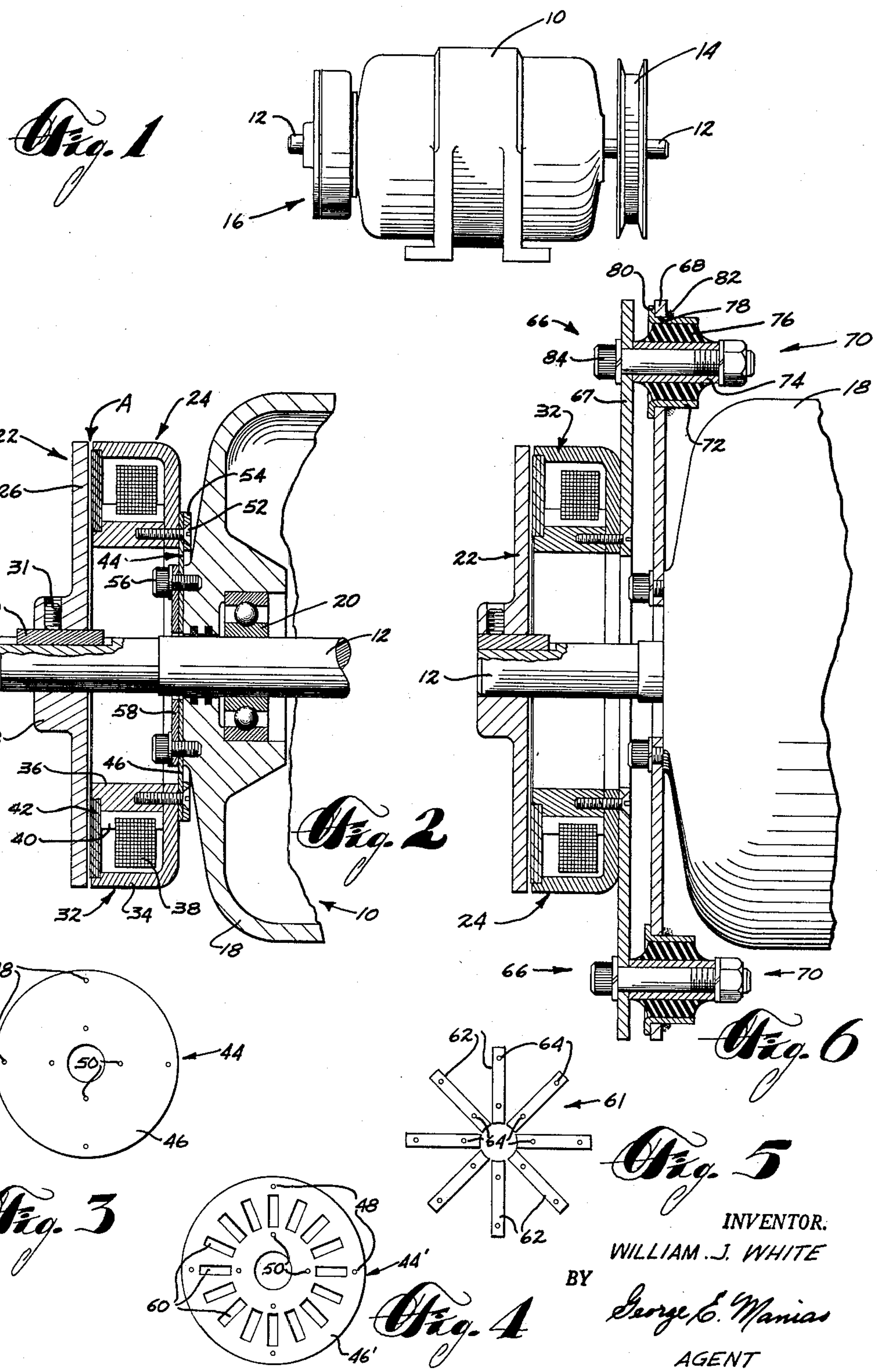
INVENTOR.
WILLIAM J. WHITE
BY George E. Manias
AGENT United States Patent Office 3,148,751
Patented Sept. 15, 1964

3,148,751
MOUNTING MEANS FOR AN ELECTRO-MAGNETIC BRAKE ASSEMBLY

William J. White, Columbus, Ohio, assignor to International Research and Development Corporation Filed Dec. 29, 1961, Ser. No. 163,169
3 Claims. (Cl. 188—164)

The present invention relates to an electromagnetic brake assembly and more particularly to novel means for mounting the electromagnetic brake assembly.

The present invention finds particular utility in balancing machines. All rotating parts of a balancing machine must be statically and dynamically balanced in order to minimize extrinsic vibrations. Extrinsic vibrations in balancing machines interfere with the dynamic observation of vibrations produced by an article that is to be balanced. Thus minimizing extrinsic vibrations in a balancing machine is of paramount importance.

One source of extrinsic vibrations is in the drive units. This is especially true wherein an electromagnetic brake assembly is mounted thereon. Electromagnetic brake assemblies essentially comprise an armature plate and a pole structure. The pole structure has an energizing magnet coil means associated therewith which energizes the pole structure. Magnetic flux is created, upon energization of the pole structure, which finds a convenient path through the armature plate. Thus the armature plate and the pole structure are attached to each other in a braking relationship.

In prior art electromagnetic brake assemblies, the armature plate is slideably retained on the drive shaft and is shiftable into braking relation with the pole structure. The armature plate, being relatively loosely retained on the drive shaft, normally tends to produce extrinsic vibrations, upon rotation, such as torsional vibrations. The static and dynamic balancing of armature plates, retained in this manner, normally reduces the vibrations but not to the sufficiently low value required for sensitive balancing machines.

Accordingly it is the primary object of this invention to provide an electromagnetic brake assembly that produces a minimum of extrinsic dynamic vibrations.

Another object of this invention is to provide a novel mounting means that has an axial flexibility and thus permits the pole structure to shift into braking relation with the armature plate.

Still another object of this invention is to provide a novel mounting means that has angular flexibility thereby greatly reducing the need for accurate axial alignment of the armature plate and the pole structure.

A further object of this invention is to provide a novel mounting means that is considerably less expensive to manufacture than presently available mounting structures.

A still further object of this invention is to provide a novel mounting means that permits rapid installation and dismantling of the pole structure.

These and other objects and advantages of the present invention will become apparent from the following detailed description by reference to the accompanying drawing in which:

FIGURE 1 is an elevation view of a drive motor illustrating an environment of the present invention;

FIGURE 2 is a fragmentary cross-sectional view illustrating the mounting means of the present invention;

FIGURE 3 is a front elevation view illustrating a flexible support means utilized in the mounting means of FIGURE 2;

FIGURES 4 and 5 are views similar to FIGURE 3 and illustrating alternative embodiments of the flexible support means; and FIGURE 6 is a fragmentary elevation view, partly in cross-section, illustrating an alternative embodiment of the present mounting means.

Referring to FIGURE 1 there is illustrated a drive motor 10 having a drive shaft 12 extending from each end thereof. A drive pulley 14 is secured to one end of the drive shaft 12 and an electromagnetic brake means 16 is secured to the other end of the shaft 12.

The drive pulley 14 is connected to the driven apparatus by means of a drive belt (not shown). The electromagnetic brake means 16 serves to stop the drive shaft 12.

Referring to FIGURE 2 the drive motor 10 includes a motor housing 18, a bearing 20 at one end and the shaft 12 extending therefrom. The motor housing 18 serves as a stationary support means. The bearing 20, supported by the motor housing 18, provides journal means which supports the drive shaft 12.

The electromagnetic brake means 16 includes an annular armature member or plate 22 and an annular pole structure 24.

The annular armature member 22 includes a plate portion 26 which is positioned substantially perpendicular to the drive shaft 12 and a hub 28 through which the drive shaft 12 extends. A key 30 extends through cooperating keyway slots in the hub 28 and the drive shaft 12, to secure the armature member 22 to the drive shaft 12 for rotation therewith. A set screw 31 serves to secure the armature member 22 in a fixed position along the drive shaft 12.

The annular pole structure 24 comprises a housing 32 made up of pole pieces 34, 36 and an energizing magnet coil means 38 maintained spaced from the housing 32 by means of spacer or insulator clips 40. An annular ring 42 of friction material is disposed in the open end of the housing 32 and provides a rough surface upon which the armature member 22 may engage. The annular pole structure 24 may comprise the pole structure described in U.S. Patent 2,971,622 issued to R. L. Jaeschke.

Referring to FIGURES 2 and 3, a flexible support means 44 connects the annular pole structure 24 to the motor housing 18. The flexible support means 44 preferably comprises a thin annular diaphragm 46 which extends between the housing 32 of the pole structure 24 and the motor housing 18. The diaphragm 46 includes bolt holes 48 adjacent to the outer edge thereof and bolt holes 50 adjacent to the inner edge thereof. The diaphragm 46 is secured to the housing 32 by means of bolts 52 which pass firstly through a ring 54. The diaphragm 46 is secured to the motor housing 18 by means of bolts 56 which pass firstly through a ring 58. The rings 54 and 58 distribute the bending stresses which the diaphragm experiences so that the diaphragm is not damaged thereby.

It should be evident in FIGURE 2 that the diaphragm 46 has axial flexibility, i.e., its peripheral portions can move longitudinally along the drive shaft 12 whereby the pole structure 24 can move into braking relation with the armature member 22 when the coil means 38 is energized. The diaphragm 46 further serves to bias the pole structure 24 away from the armature member 22. As can be seen, the pole structure 24 is normally spaced from the armature member 22 as indicated at A.

Still further, the diaphragm 46 has angular flexibility, i.e., in the situation wherein the armature member 22 and/or the pole structure 24 are not at right angles to the drive shaft 12, the pole structure 24 may be angularly displaced into uniform surface contact with the armature member 22.

The armature plate 22 may be statically and dynamically balanced after assembly on the drive shaft 12. Since the armature member 22 is secured to the drive shaft 12 in a fixed position, its rotational vibration can be minimized.

As can be seen in FIGURE 2, the pole structure is installed merely by bolting the diaphragm 46 and the ring 58 to the motor housing 18. Automatic alignment is attained. The armature member 22 is then secured to the drive shaft 12 by means of the key 30 and maintained in properly spaced relation with the pole structure 24 by means of the set screw 31.

Reference is now directed to FIGURES 4 and 5 wherein alternative embodiments of the present flexible support means are illustrated.

In FIGURE 4 a flexible support means 44' comprises a thin annular diaphragm 46' having bolt holes 48 and 50 adjacent to the outer edge and inner edge thereof respectively. The diaphragm 46' includes a plurality of radial slots 60 formed therein in the region which extends between the annular pole structure 24 and the motor housing 18. The slots 60 serve to increase the flexibility of the diaphragm 46'.

In FIGURE 5 a flexible support means 61 comprises a plurality of thin radial arms 62 having bolt holes 64 adjacent to each end thereof. The bolt holes 64 correspond to the bolt holes 48, 50 previously described. The arms 62 extend radially from the motor housing 18 to the annular pole structure 24 and are secured thereto.

Reference is now directed to FIGURE 6 wherein a further alternative embodiment of the present flexible support means is illustrated. Corresponding numerals are employed to identify corresponding parts already described.

A flexible support means 66 comprises a first annular plate 67 and a second annular plate 68 which are secured to the housing 32 and the motor housing 18 respectively. Extensible support means 70 extend between the first and second annular plates 67, 68 and maintain the pole structure 24 in spaced substantially parallel relation with the armature member 22.

As specifically illustrated in FIGURE 6, two extensible support means 70 are utilized. Preferably the two extensible support means 70 and the drive shaft 12 lie in substantially the same vertical plane. Alternatively three, four or more extensible support means 70 may be used.

The extensible support means 70 comprise an outer tubular member 72, an inner tubular member 74 and a plug of elastomeric material 76. The outer tubular member 72 extends through a passageway 78 in the second annular plate 68 and includes an outturned shoulder 80 which abuts the second plate 68. The outturned shoulder 80 serves to position the extensible support means 70 on the second annular plate 68. Preferably the outer tubular member 72 is secured to the second plate 68, as for example, by means of a tack weld 82.

The inner tubular member 74 preferably is secured to the first annular plate 67 by means of a bolt 84. The inner tubular member 74 extends through the outer tubular member 72 as illustrated.

The plug of elastomeric material 76 is positioned within the annular space provided by the outer and inner tubular members 72, 74. The plug of elastomeric material 76 is bonded to the inner and outer surfaces of the outer and inner tubular members 72, 74. The extensible support means 70 may comprise the type of support means illustrated and described in U.S. Patent 2,019,052 issued to H. C. Lord.

It should be evident from the foregoing detailed description that the present invention provides an electromagnetic brake means that produces a minimum of extrinsic vibrations. Further that the present invention provides a novel mounting that has axial and angular flexibility thereby permitting the axial and angular displacement of the annular pole structure. Still further the present invention provides a novel mounting means that is relatively inexpensive to manufacture and which permits rapid installation and dismantling of the pole structure.

According to the provisions of the patent statutes, I have explained the principle, preferred embodiment and mode of operation of my invention and have illustrated and described what I now consider to represent its best embodiment. However, I desire to have it understood that within the scope of the appended claims, the invention may be practiced otherwise than as specifically illustrated and described.

I claim:

1. In combination:

an electric motor having a motor housing and a drive shaft extending therefrom;

electromagnetic brake means including:

an annular armature member rigidly secured to said drive shaft for rotation therewith, and an annular pole structure having energizing magnet coil means associated therewith for energization thereof, said annular pole structure being spaced from the said armature member;

a first plate secured to said motor housing and extending outwardly therefrom;

a second plate secured to the said annular pole structure and extending outwardly therefrom; and extensible support means extending between said first plate and said second plate for maintaining the said annular pole structure in spaced substantially parallel relation with said annular armature plate whereby said annular pole structure is shiftable into braking relation with the said annular armature member in response to the energization of said coil means.

2. The combination of claim 1 including a pair of said extensible support means extending between the said first plate and said second plate, said pair of extensible support means and said drive shaft lying in substantially the same vertical plane.

3. The combination of claim 1 wherein the said extensible support means comprises:

an outer tubular member secured to and extending through one said plate, an inner tubular member secured to the other said plate and extending through the said outer tubular member, and a plug of elastomeric material bonded to the outer and inner surface of said inner and outer tubular member respectively.

References Cited in the file of this patent

UNITED STATES PATENTS 2,549,217 Mason ---------------- Apr. 17, 1951

FOREIGN PATENTS 547,328 France ---------------- Dec. 7, 1922